H. MENDELSOHN.
COIN HANDLING MACHINE.
APPLICATION FILED JULY 8, 1913.

1,242,016.

Patented Oct. 2, 1917.
13 SHEETS—SHEET 1.

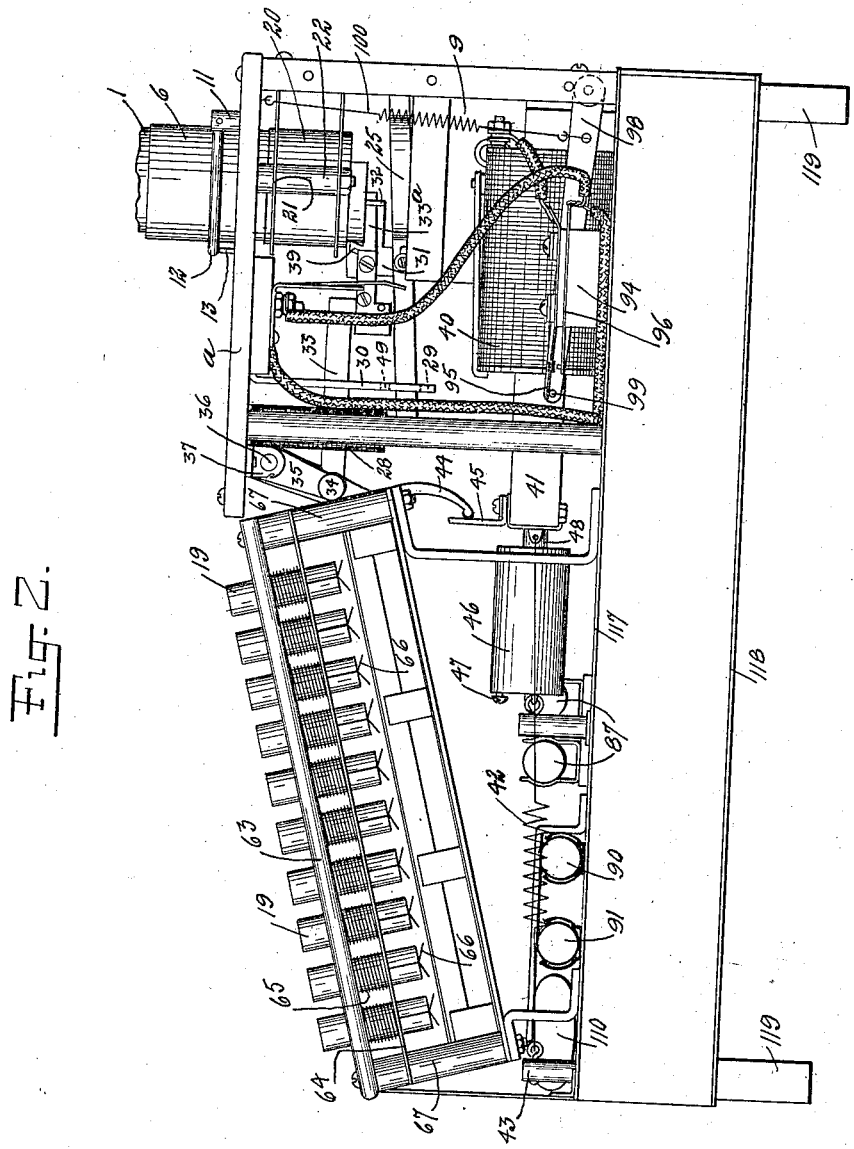

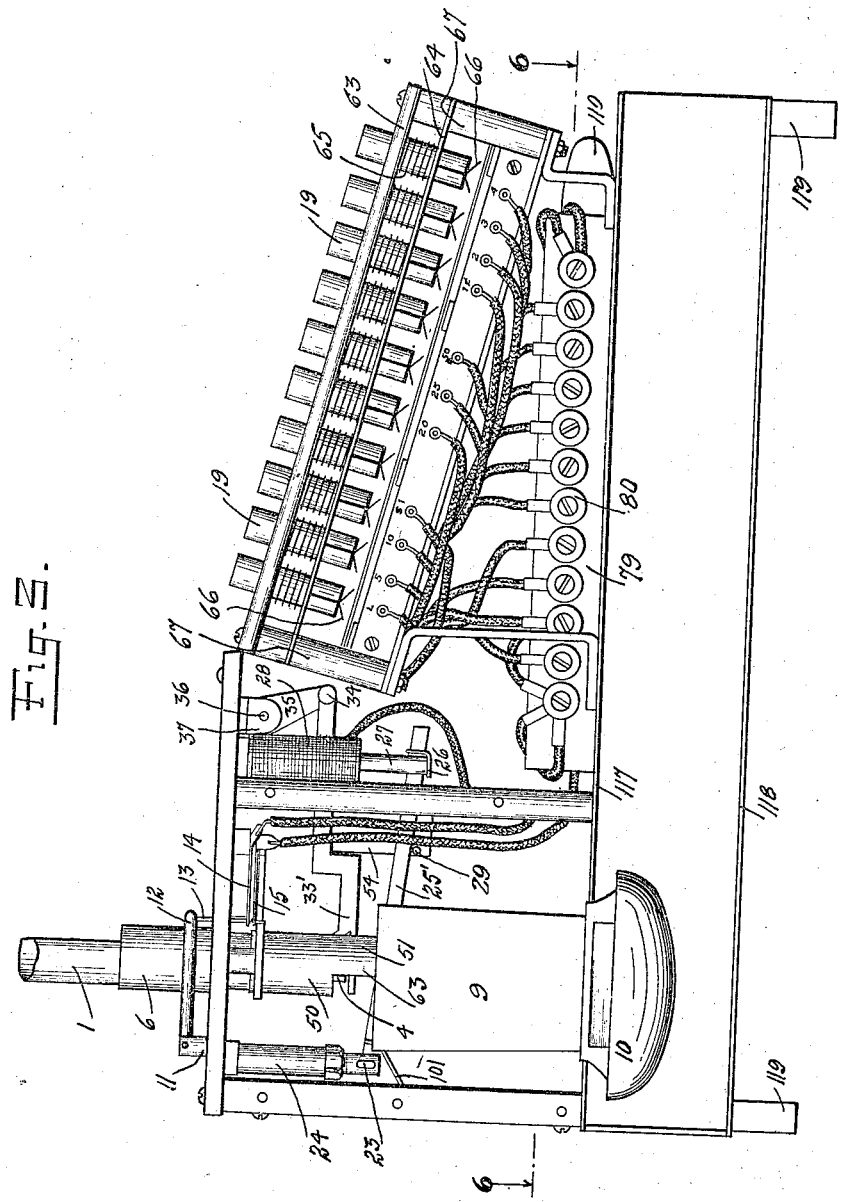

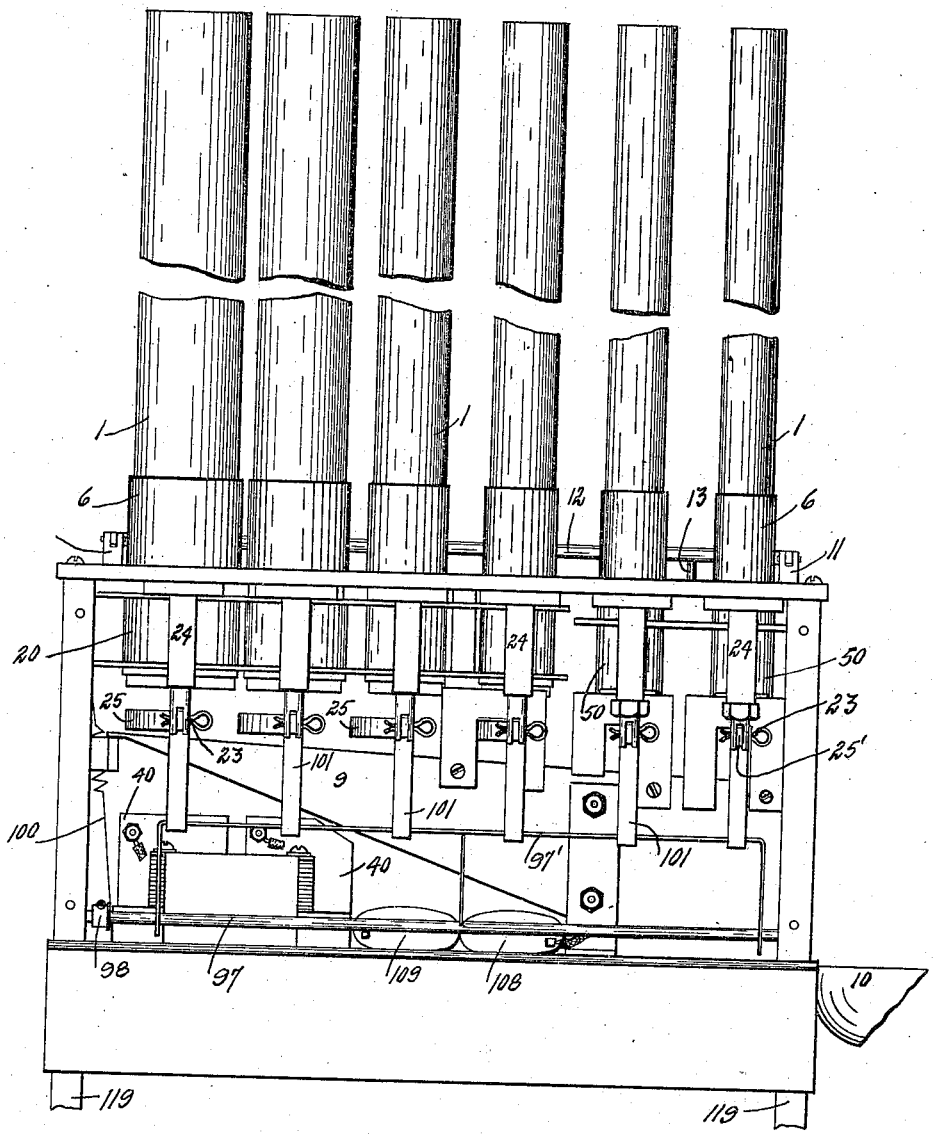

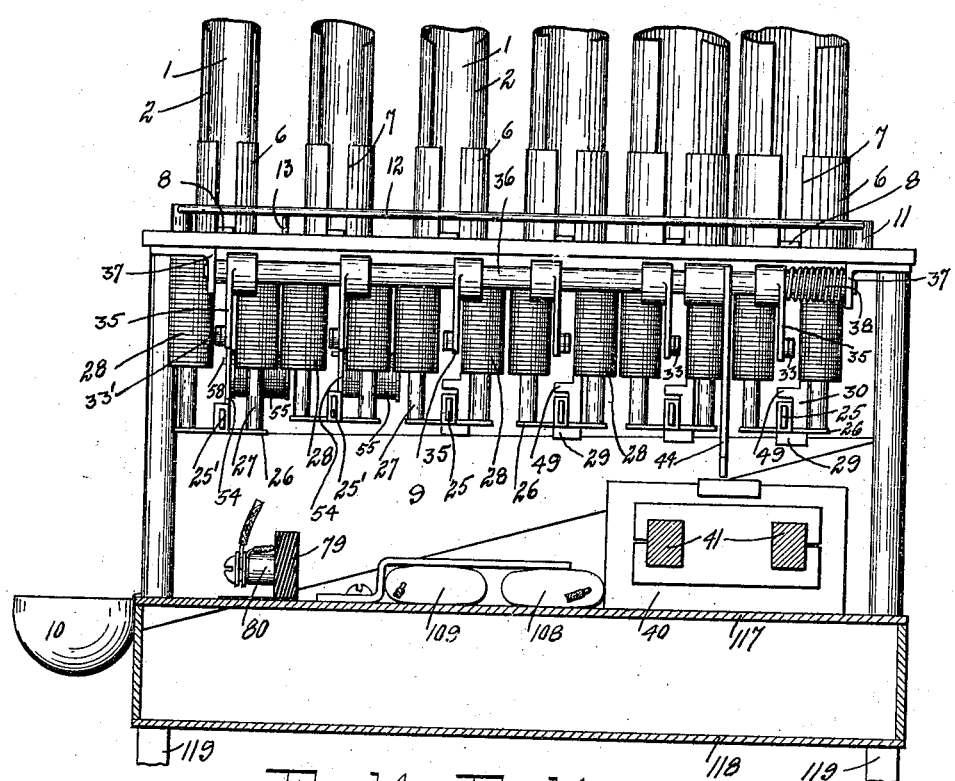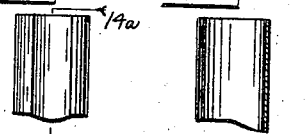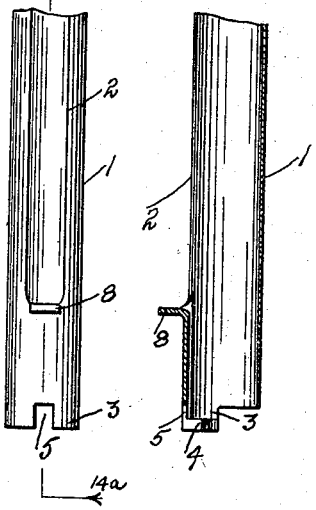

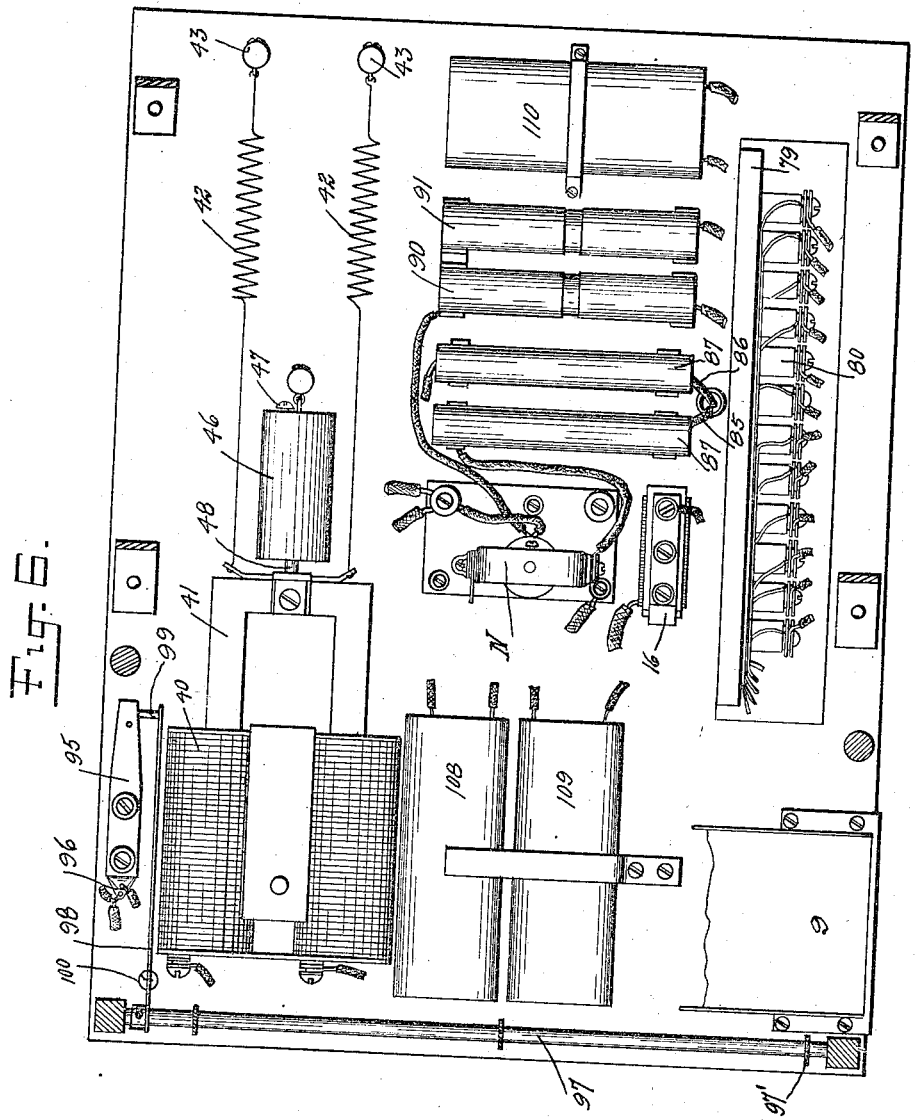

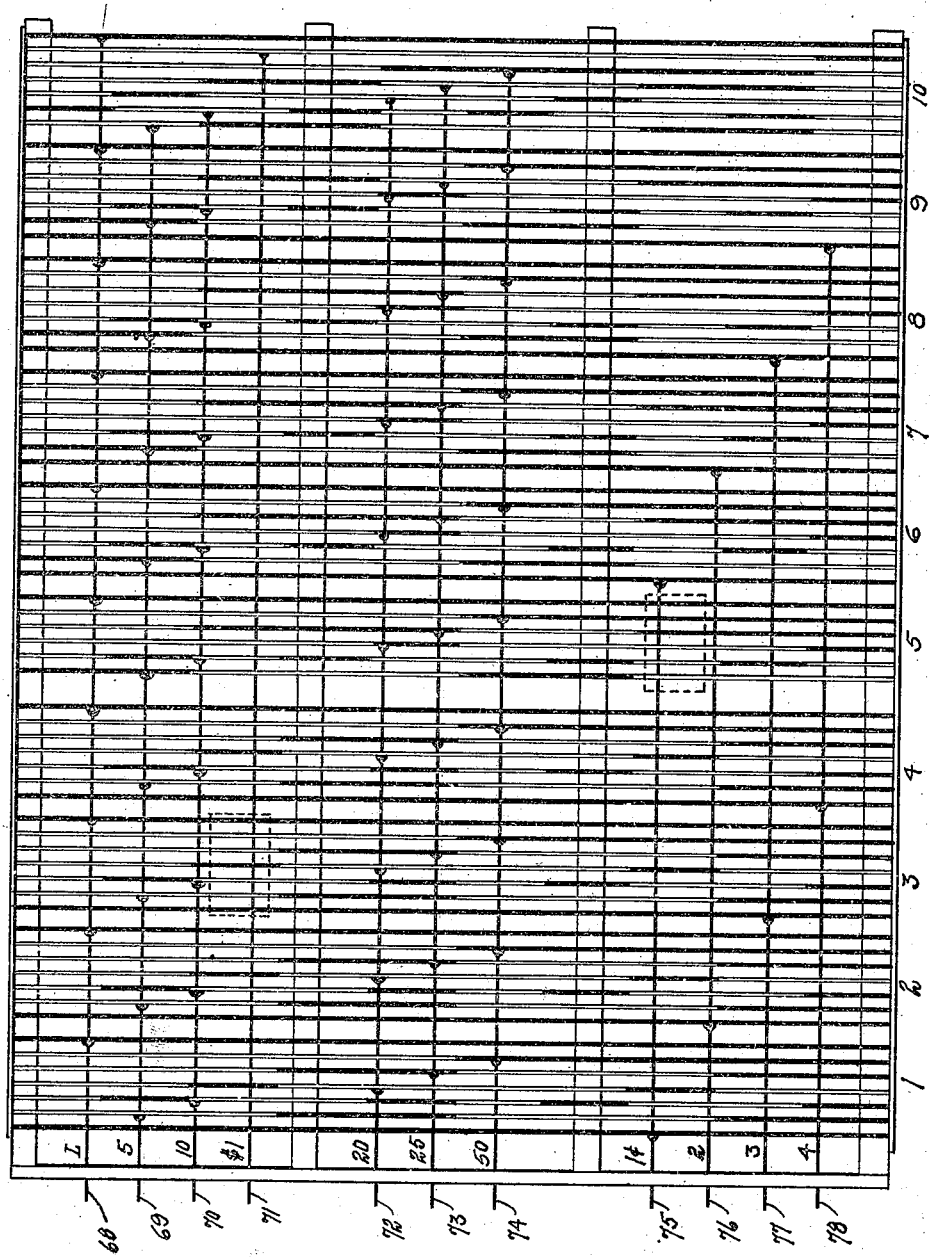

H. MENDELSOHN.
COIN HANDLING MACHINE.
APPLICATION FILED JULY 8, 1913.
1,242,016.
Patented Oct. 2, 1917.
13 SHEETS—SHEET 8.
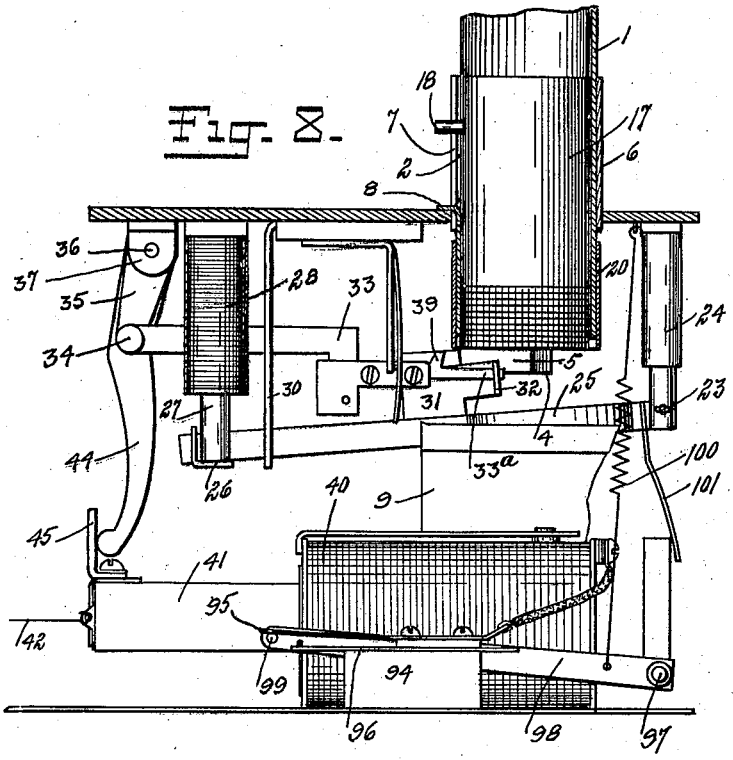

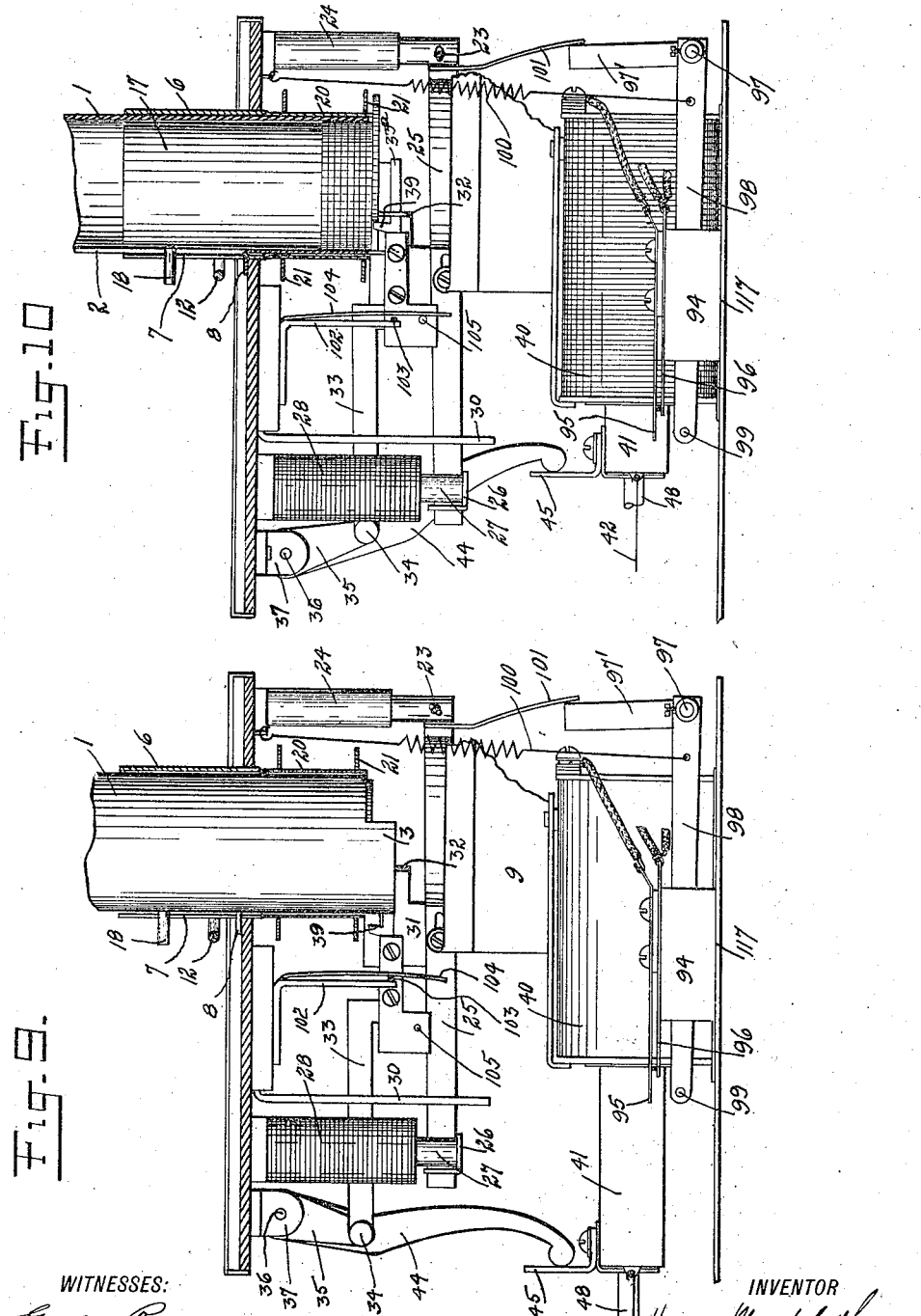

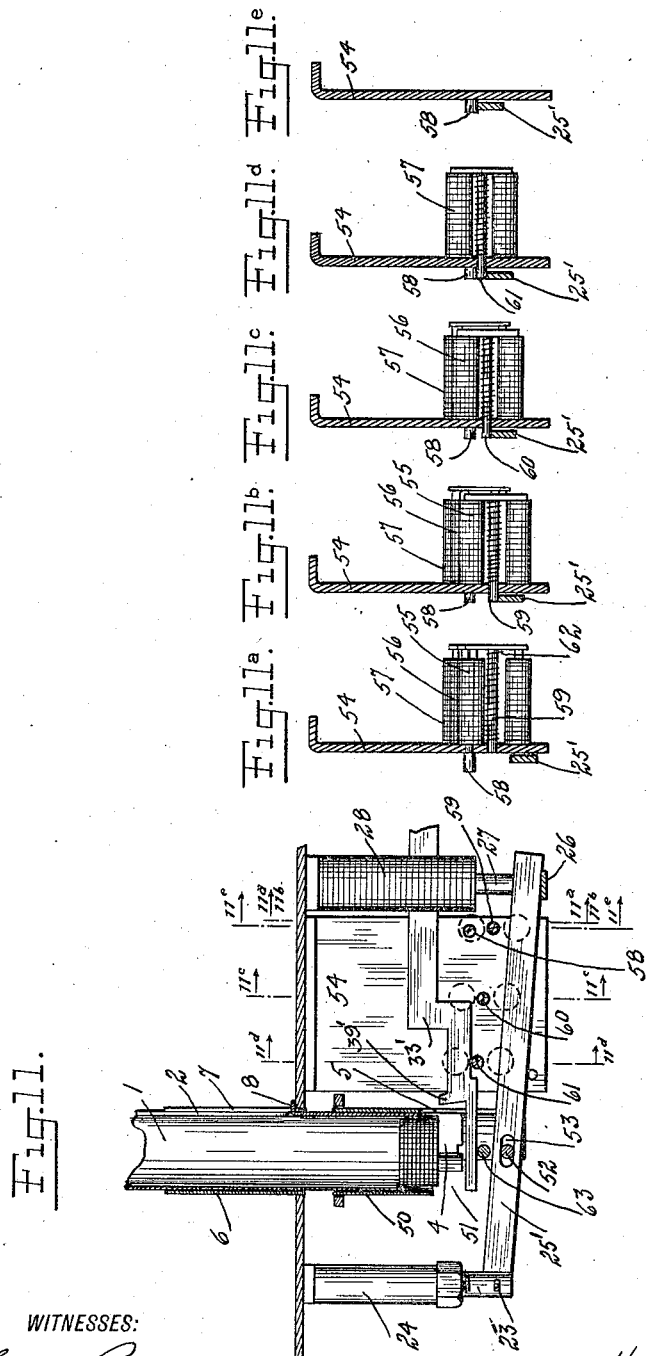

H. MENDELSOHN.
COIN HANDLING MACHINE.
APPLICATION FILED JULY 8, 1913.
1,242,016.
Patented Oct. 2, 1917.
13 SHEETS—SHEET 11.
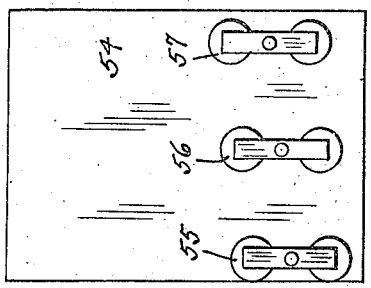
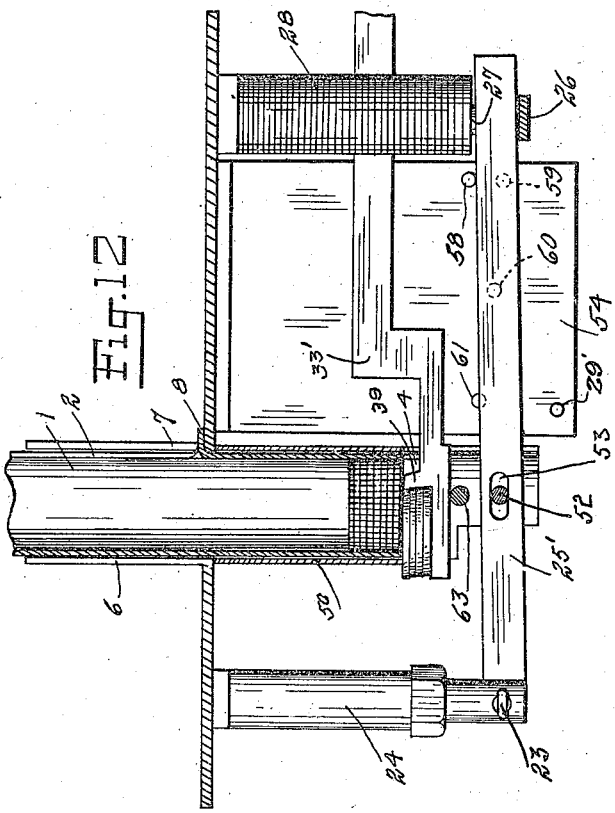
WITNESSES:
INVENTOR
Harry Mendelsohn
BY
ATTORNEY H. MENDELSOHN.
COIN HANDLING MACHINE.
APPLICATION FILED JULY 8, 1913.
1,242,016.
Patented Oct. 2, 1917.
13 SHEETS—SHEET 12.
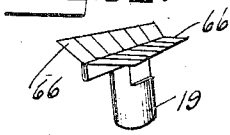
Fig.15.
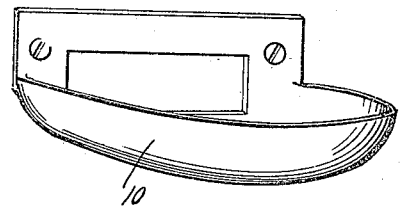
Fig.17.
Fig.17.ª
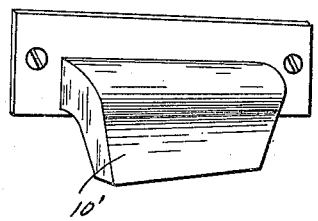
Fig.17.ᵇ
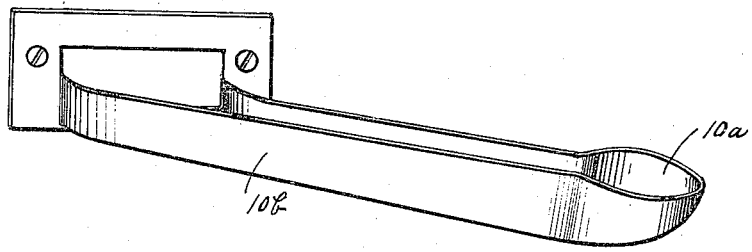
WITNESSES:
INVENTOR
Harry Mendelsohn
BY
ATTORNEY

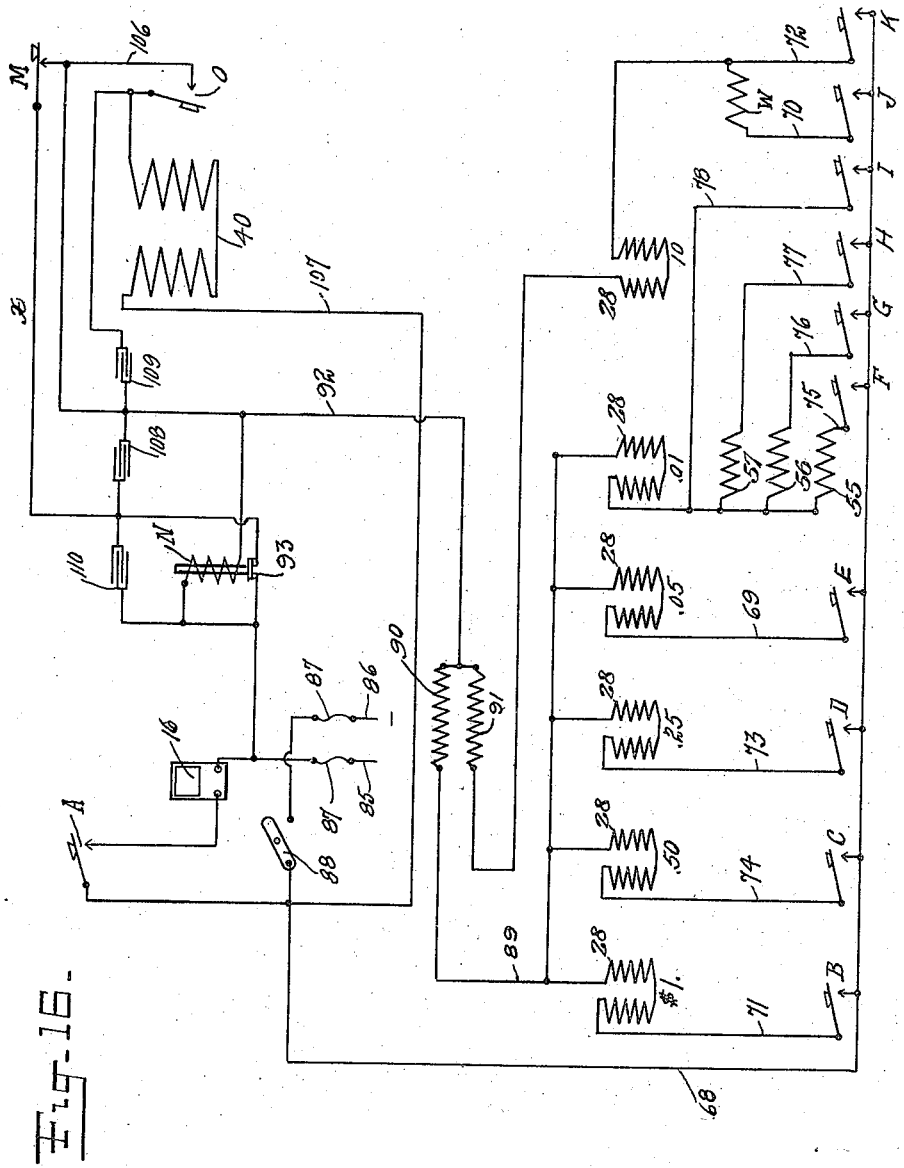

UNITED STATES PATENT OFFICE.

HARRY MENDELSOHN, OF WESTFIELD, NEW JERSEY.

COIN-HANDLING MACHINE.

1,242,016. Specification of Letters Patent. Patented Oct. 2, 1917.

Application filed July 8, 1913. Serial No. 777,808.

*To all whom it may concern:*

Be it known that I, HARRY MENDELSOHN, a citizen of the United States, and a resident of Westfield, in the county of Union and State of New Jersey, have made new and useful Improvements in Coin-Handling Machines, of which the following is a full, clear, and exact description.

This invention relates generally to coin handling machines; more particularly it is directed to new and useful improvements in machines designed to deliver a number of coins aggregating a predetermined value. The object of the invention, generally speaking, is to provide such a machine which is characterized by mechanism operating to accurately deliver a quantity of money representing a certain predetermined value or amount; more specifically the invention aims to produce a machine which will perform the function indicated by means of electrically actuated mechanism.

In the accompanying sheets of drawings one embodiment of the invention is set forth as the preferred construction, it being apparent, from a consideration of the disclosure to be set forth that various equivalents may be availed of to perform the result desired in substantially the same manner, the inventive idea not being departed from in the use of such equivalents; the similar characters of reference in the different views refer to like parts of the construction.

Fig. 2 is a side view, with the casing removed, showing the parts adjacent the said side;

Fig. 3 is an opposite side view, with the casing removed, showing the parts adjacent the said side;

Fig. 4 is a rear elevation, with the casing removed;

Fig. 5 is a vertical sectional view on the line 5—5 of Fig. 1;

Fig. 6 is a sectional view on the line 6—6 of Fig. 3 showing the plan of the bottom portion of the machine;

Fig. 7 is a detail plan view of the several bars forming portions of the several circuits of the operating and selective mechanisms;

Fig. 8 is a side view showing the detail of the coin expelling member and the positioning mechanism in connection with one coin holder;

Fig. 9 is a similar view showing the position of the said member previous to expelling a coin from the coin holder;

Fig. 10 is a similar view showing the said member expelling a coin from the chute;

Fig. 11 is a side view showing the detail of the coin expelling member and the positioning mechanisms in connection with a holder containing coins of such denomination that two or more of such coins may be expelled in making up the predetermined value desired;

Figure 1:
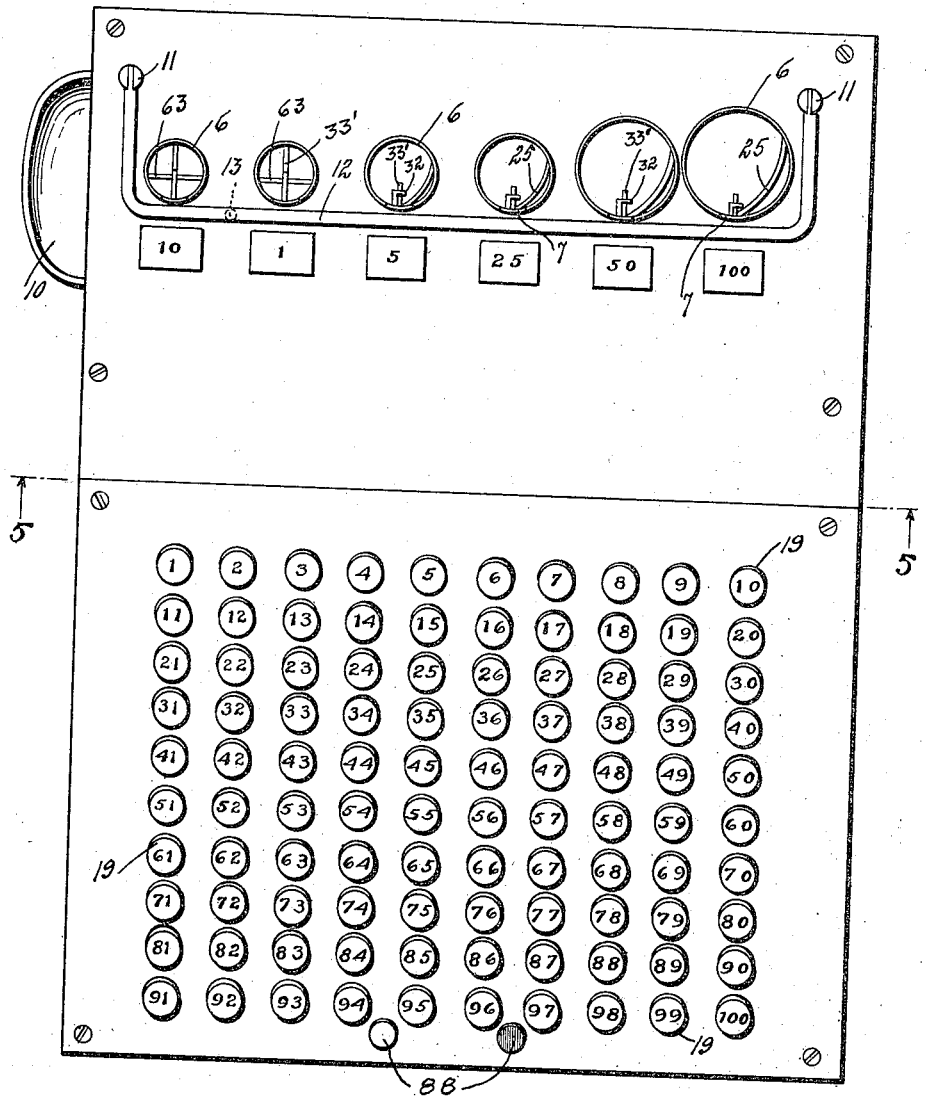
Figure 1 is a plan view of the machine with the coin holders removed.

Fig. 11$^a$ is a sectional view on the line 11$^a$—11$^a$ of Fig. 11;

Fig. 11$^b$ is a sectional view on the line 11$^b$—11$^b$ of Fig. 11;

Fig. 11$^c$ is a sectional view on the line 11$^c$—11$^c$ of Fig. 11;

Fig. 11$^d$ is a sectional view on the line 11$^d$—11$^d$ of Fig. 11;

Fig. 11$^e$ is a sectional view on the line 11$^e$—11$^e$ of Fig. 11;

Fig. 12 is a view similar to Fig. 11 showing the coin expelling member in operative position to expel four coins;

Fig. 12$^a$ is a side view of the solenoids forming the secondary positioning mechanism of Figs. 11 and 12;

Fig. 13 is a side view of the electrically controlled switch;

Fig. 14 is an elevation of one of the coin holders;

Fig. 14$^a$ is a sectional view thereof on the line 14$^a$—14$^a$ of Fig. 14;

Fig. 14$^b$ is a bottom plan view of the holder;

Fig. 15 is a perspective view of one of the keys;

Fig. 16 is a diagrammatic view of the wiring of the several circuits and the parts associated therewith;

Fig. 17 is a perspective view of the pocket used with the machine and illustrated in the previous views;

Fig. 17$^a$ is a perspective view of a modified form of pocket adapted to receive the open end of an envelop; while Fig. 17$^b$ sets forth a construction wherein the pocket is placed adjacent the operator of the machine.

The subject matter of this application comprises a machine made up of a number of coöperating parts adapted to deliver at each operation a single coin or a number of coins of or aggregating a certain desired or predetermined amount or value. The machine shown as embodying the invention may be conveniently described as made up of certain groups of parts or elements adapted to perform certain functions, all of such groups being coöperative in producing the final desired result, such groups being as follows:— the coin holders for holding the coins and for presenting them in position for delivery: the coin delivery mechanism for delivering one or more coins at a time from certain of the holders and for delivering only one coin at a time from other holders, and comprising a coin-expelling member for each coin holder, positioning means for each expelling member, secondary positioning means for determining the position of the expelling members associated with the holders from which either one or a plurality of coins may be delivered, and operating means for operating the expelling members; and the selecting and controlling means including the key board and the electrical circuits and automatically operating circuit controlling devices, whereby the parts of the delivery mechanism are controlled and caused to operate for delivering a coin or coins of or aggregating the desired value, and whereby more than a single operation of the expelling means when a circuit closing key has been operated and until such key has returned to normal position is prevented.

*Coin holders.*—The machine shown is designed to deliver coins of six different denominations, and is provided with six coin holders for holding respectively, silver dollars, fifty cent pieces, twenty-five cent pieces, ten cent pieces, nickel five cent pieces, and one cent pieces. Each holder 1, which may be of any desired length, is of a diameter suitable for receiving in superposed flatwise relation coins of the denomination it is intended to hold, and has a longitudinally extending finger opening 2 for convenience in placing the coins in the holder, such opening terminating a short distance from the lower end of the holder. The bottom end of the holder is provided with a substantially semi-circular extension 3 which has an inwardly extending flange or shelf 4 for supporting the stack of coins in the holder, and the extension 3 and shelf 4 have an opening or passageway 5 extending therethrough diametrically of the holder. The length or depth of the extension 3 exceeds the thickness of the shelf 4 by an amount at least equal to, and the passageway 5 extends upward from the top of the shelf a distance at least equal to, the thickness of a single coin, or in case of holders from which a plurality of coins may be delivered at one time, the thickness of the greatest number of coins which may be delivered. The purpose of the passageway 5 is to permit the coin-expelling member to travel through the bottom of the holder in expelling a coin or coins therefrom. The holders are independently removably positioned in collars 6 of suitable diameters carried by the frame of the machine, each collar having at one side a slot or opening 7 into which a projection 8 extending outward from the holder near its bottom end enters to thereby properly position the holder. Beneath the holders is a trough 9 having an inclined bottom and having its lower end in position to deliver coins received from the holder into a cup 10 at one side of the machine.

Extending across the machine adjacent the front side of the collars 6 is a bar 12 the ends of which extend rearwardly and are pivotally supported by supports 11. The bar 12 normally stands in the position shown in Figs. 2 and 3 being supported by a movable pin 13 which rests against a spring contact piece 14 mounted in position to contact with a second contact piece 15 when depressed but normally standing out of contact therewith. The contact pieces 14 and 15 are connected in a circuit including a buzzer 16 or other alarm device. A weight or follower 17 is provided in each coin holder to rest on top of the stack of coins in the holder, and each such follower has a projection 18 to extend outward through the opening 2 of the holder and the opening 7 of the collar 6, and this projection when the stack of coins in the holder has been nearly depleted engages the bar 12 and by moving the bar downward thereby depresses the contact piece 14 to close the alarm circuit. The alarm device will thus be caused to operate whenever the supply of coins in any holder is nearly exhausted, thus indicating that the holder needs to be refilled or replaced with a filled holder.

The operation of the machine to deliver coins representing a desired amount within the capacity of the machine is effected by pressing a finger key or circuit closing device corresponding to the amount to be delivered, there being a finger key for each amount which the machine is capable of delivering. As shown, the machine is constructed to deliver any amount from one cent to one hundred cents, or one dollar, inclusive, and has, therefore, one hundred finger keys 19 for causing the delivery respectively of coins ranging in value from one cent to one hundred cents, each key bearing a mark corresponding to the amount which its operation will cause the machine to deliver. Certain amounts to be delivered require the delivery of only a single coin; other amounts require the delivery of a plurality of coins of different denominations, and still other amounts require the delivery of a plurality of coins of the same denomination with or without one or more coins of a different denomination or denominations. In the present machine the only coins of which more than one is required to be delivered to make up any certain amount are the ten cent pieces and the one cent pieces. To avoid duplication of the ten cent and one cent holders, the machine is arranged to deliver either a single coin or two coins at a time from the ten cent holder, and either a single coin or two, three or four coins at a time from the one cent holder. It is of course desirable that the machine shall be constructed to select and deliver the least number of coins required to represent any given amount to be delivered, and the present machine is arranged with this consideration in view.

*Coin delivery mechanism.*—The delivery mechanism comprises a coin-expelling member associated with and for expelling coins from the bottom of each coin holder, positioning or controlling means associated with each expelling member for controlling such member to cause it to deliver or not to deliver according to the selective operation of the positioning means, secondary positioning means, or variable position determining means, for determining the operative position of the expelling members associated with the ten cent and one cent holders for causing the desired number of coins to be delivered from such holders, and operating means for operating the expelling members.

Referring first to the delivery devices associated with the coin holders from which a single coin only is delivered at each operation, that is, in the machine shown, the five cent, twenty-five cent, fifty cent and one dollar holders, which are the first four holders from the right hand side of the machine as viewed in Figs. 1 and 5, and referring especially to Figs. 2, 5, 8, 9 and 10, the lower ends of these coin holders extend, when the holders are in position, beneath the plate $a$ of the machine frame or casing and are surrounded by vertically movable sleeves 20, spaced guides 21 carried by posts 22 being provided for holding the sleeves 20 in position when the holders are removed from the machine. Pivotally secured as indicated at 23 to a support 24 and extending forward past the lower end of each of these single coin delivery holders, is a lever 25 the forward end of which engages a cross piece 26 carried by the cores 27 of a double solenoid 28. The solenoid is normally dead, allowing the lever 25 to remain in its normal inoperative position in which it is supported on a lug 29 extending from the lower end of a post or hanger 30. The lever 25 has an offset 31 formed with a part 32 extending at right angles and having an opening to receive and to act as a support for one end of a coin-expelling member 33. The end of the coin-expelling member 33 toward the front of the machine is pivotally secured, as indicated at 34, to and supported by an arm 35 depending from a rock shaft 36 which extends across the machine, being mounted in end bearings 37. The coin-expelling member has a coin engaging projection or shoulder 39, and the end 33$^a$ of the member extending beyond the shoulder 39 rests in the opening in the part 32 of the positioning lever 25, so that the coin-expelling member is supported and vertically positioned adjacent the lower end of the coin holder by the positioning lever while being free to move endwise relatively to the positioning lever.

When the positioning lever 25 is in its normal inoperative position as shown in Fig. 8, the expelling member 33 is supported thereby in position such that when moved toward the rear of the machine by the rocking of the shaft 36 its coin engaging shoulder 39 will move beneath the bottom coin in the holder without coming into engagement therewith. When the solenoid 28 is energized, however, to lift the lever 25, the free end of the expelling member is raised to bring it into such position relatively to the bottom of the coin holder that when it is given its expelling movement its coin engaging shoulder 39 will come into engagement with the edge of the bottom coin in the holder and, moving forward through the slot or passageway 5 in the bottom of the holder, will push the bottom coin and cause it to be discharged from the holder into the underlying trough 9. The upward movement of the positioning lever 25 under the pull of the solenoid 28 is limited in the machine shown by a stop 49 carried by the post 30, see Fig. 5. At the same time that the expelling member is lifted into operative position by the lever 25, the sleeve 20 which is supported by a part of the offset 31 of the lever 25 is also raised to permit the movement of the bottom coin from the holder. When the lever 25 is in its normal position and the expelling member 33 in position to be reciprocated without discharging the coin from the holder, the sleeve 20 is also lowered to the position shown in Fig. 8 and serves when in this position to prevent coins dropping from the holder by reason of vibration of the machine when coins are being discharged from other holders.

The rock shaft 36 has an arm 35 connected with the expelling member associated with each coin holder so that when the shaft is rocked the expelling members are all reciprocated. The shaft is rocked by means of a double solenoid 40, the double core 41 of which is normally maintained in the position shown in Figs. 2, 6, 8 and 9 by springs 42 secured to posts 43. The rock shaft carries a downwardly extending arm 44 which, when the solenoid 40 is energized and its core 41 moved toward the rear of the machine, is engaged and moved toward the rear of the machine by a projection 45 carried by the core 41, the shaft being thereby rocked and through its arms 35 operating the several coin-expelling members. The circuit of the operating solenoid 40 is controlled as hereinafter described so that whenever any one or more of the positioning devices have been operated to bring the corresponding expelling members into operative position the operating solenoid will be energized to operate the expelling members and to cause coins to be delivered from the holders whose expelling members have been set to operative position. In order to prevent undue shock on the return of the core 41 under the influence of the springs 42 when the solenoid is deënergized, a cushioning means is provided, such cushioning means as shown being formed by a cylinder 46 provided with an adjustable relief valve 47 and having a piston the rod 48 of which is connected with the core 41. The valve 47 being suitably adjusted, the air cushion thus provided will retard the return movement of the cores 41, thereby minimizing noise and shock.

The operation of the delivery mechanism above described is as follows: Assuming for example that it is desired to have the machine deliver seventy-five cents, then on pressing the finger key 19 bearing the mark 75 the positioning solenoids associated with the fifty cent and the twenty-five cent coin holders will be energized and the corresponding positioning levers 25 lifted, thereby lifting the corresponding coin-expelling members 33 to operative position and at the same time raising the sleeves 20 which normally serve to prevent edgewise movement of the bottom coins from the fifty cent and twenty-five cent holders. The operating solenoid 40 will then be energized and the movement of its core 41 will rock the shaft 36 and operate the several expelling members 33, thereby causing the expelling members for the fifty cent and twenty-five cent holders, which are then in operative position, to discharge each one coin from its holder, the movement of the other expelling members being ineffective, their engaging shoulders moving beneath the bottom coins in their respective holders. The fifty cent piece and twenty-five cent piece thus discharged from their holders, falling into the trough 9, will be delivered to the cup 10 in position for removal.

Referring now to the variable delivery devices associated with the ten cent and one cent holders which, as before pointed out, are constructed to cause the delivery of either one or a plurality of coins at an operation, this desired result is secured in accordance with the present invention by providing in combination with the selectively operated positioning devices associated with these holders secondary positioning means, or variable position determining means, whereby when the expelling member for either of these holders is moved into operative position its exact position will be fixed according to the number of coins to be delivered by the ensuing expelling movement. Referring first to the devices associated with the one cent holder, from which either 1, 2, 3 or 4 coins may be expelled by a single movement of the expelling member, and which devices are particularly illustrated in Figs. 3, 5 and 11 to 12$^a$, the positioning lever 25' is supported as indicated at 23, at the rear of the bottom of the holder as in the case of the positioning levers for the one coin delivery holders, from a depending post 24, and the other end of the lever extends into engagement with the cross piece 26 carried by the cores 27 of the positioning solenoid 28 which operates this lever. Mounted in position to receive the end of the coin holder when the latter is in position in the machine, is a vertically movable sleeve 50 which is similar to the sleeves 20 of the single coin delivery holders, but which is provided with downwardly extending side portions 51 between which extends a pin 52 which passes through a slot 53 in the positioning lever 25' so that the sleeve is supported by the positioning lever and when the lever is raised the sleeve is lifted a distance corresponding to the upward movement of the lever and the number of coins to be delivered. When the lever is in its normal lowered position as shown in Fig. 11, the rear edge of the sleeve lies opposite the lowermost coin in the holder and thus serves to prevent unintended dropping of coins from the holder, and when the sleeve is lifted its rear edge serves as a stop or gage to prevent more than the desired number of coins from moving out of the holder. The coin-expelling member 33' is similar to the expelling members 33, extending transversely of the bottom of the coin holder and being supported at its end toward the front of the machine by one of the arms 35 extending downward from the rock shaft 36 with which it is pivotally connected as indicated at 34. The rearward end of this expelling member is, however, supported by a pin or cross piece 63 extending between the downwardly extending portions 51 of the sleeve 50 and thus receives its upward movement from the positioning lever by way of the sleeve. The coin-engaging shoulder 39' of the expelling member is of a depth at least equal to the thickness of the greatest number of coins to be expelled at one time, in this instance four.

The extent of the upward movement of the positioning lever 25' when its solenoid 28 is energized, and the resulting operative position of the expelling member 33', is determined by selectively controlled position determining means which in the machine shown comprises a plurality of electrically controlled stops for limiting the upward movement of the positioning lever. Extending downwardly from the plate *a* at one side of the expelling member 33' and positioning lever 25', is a support 54 to which are secured three solenoids 55, 56 and 57. Extending from the side of the support 54 toward the positioning lever is a fixed stop 58, and extending through openings in the support at different heights or elevations are three stop rods 59, 60 and 61 which are adapted to be projected into the path of movement of the positioning lever and the other ends of which on the far side of the support are carried by cross pieces on the cores of the solenoids 55, 56 and 57. The solenoid cores are normally held in retracted position by springs 62 on the rods, and when in this position the ends of the rods are retracted out of the path of movement of the lever 25'. When the stop rods are in such retracted position the positioning lever is free to move upward until stopped by the fixed stop 58. When the positioning lever makes its maximum movement into engagement with the fixed stop 58, the expelling member 33' is thereby lifted to bring its coin engaging shoulder 39 into position such that when the member is operated from the rock shaft 36 four coins will be expelled from the holder. Whenever any one of the solenoids 55, 56 and 57 is energized the end of its stop rod will be projected beyond the face of the support 54 to limit the upward movement of the positioning lever. The position of the stop rods is such that the rod 59 will stop the upward movement of the lever when the expelling member has been lifted into position for causing the discharge of one coin from the holder, the rod 60 will allow a greater upward movement of the positioning lever but will stop it when the expelling member has been raised to position for discharging two coins from the holder, and the rod 61 is still higher but below the fixed stop 58 and serves to limit upward movement of the positioning lever when the expelling member has been raised to position for discharging three coins from the holder.

In the operation of this variable delivery mechanism, if a single coin is to be delivered from the holder the solenoid 28 and the solenoid 55 are energized, causing the positioning lever to be lifted to raise the expelling member and causing the stop rod 59 to be projected to so limit the upward movement of the positioning lever that the expelling member will be positioned to engage and deliver a single coin only when it is operated from the rock shaft 36. If two coins are to be delivered from the holder, the solenoid 56 will be energized instead of the solenoid 55, so that when the positioning lever is lifted by the solenoid 28 its upward movement will be limited by the stop rod 60 and the expelling member will be positioned for engaging and delivering two coins from the holder. Similarly, if three coins are to be delivered, the solenoid 57 and solenoid 28 will be energized and the positioning lever will be lifted and stopped in position to position the expelling member for delivering three coins. If four coins are to be delivered neither of the solenoids 55, 56 or 57 will be energized and all the stop rods will remain in retracted position, so that when the solenoid 28 is energized the positioning lever will be raised until it comes into engagement with the stop 58, thus receiving its maximum movement and lifting the expelling member into position to deliver four coins from the holder. A stop 29' on the support 54 supports the positioning lever in its normal lowered position.

The variable delivery mechanism for the ten cent holder is the same as the mechanism just described for the one cent holder except that as the expelling member is required to be positioned in only two operative positions, only one movable stop rod and one secondary positioning solenoid is required, this stop rod being positioned to limit the upward movement of the positioning lever 25' associated with the ten cent holder when it has been raised to bring the corresponding expelling member into position for delivering a single coin.

*Selecting and controlling means, including the key board and the electrical circuits and automatically operating circuit controlling devices.*—As before pointed out, the machine is caused to operate for delivering any desired amount of money within its capacity by means of the finger keys 19. These finger keys, of which there are one hundred in the machine as shown, are in the construction shown formed by short rods or key pieces mounted for endwise movement through openings in spaced plates 63 and 64 and normally held up in inoperative position by means of springs 65 against the pressure of which the keys may be depressed as desired for causing the delivery of sums of money corresponding to the marks on the keys. Each key piece carries at its lower end a contact device whereby when the key is depressed certain operating circuits will be closed. The keys are arranged in ten rows or banks of ten keys each extending in the direction from front to rear of the machine, and beneath each row or bank of keys there is mounted a group of contact or terminal bars c of conducting material. Each group of contact bars, with exception of the fifth group from the right in Fig. 7, comprises seven bars, the fifth group being made up of only six bars. Extending transversely beneath the contact bars is a series of connecting bars or wires marked respectively L, 5, 10, $1, 20, 25, 50, 1¢, 2, 3, 4. The wire L connects with a wire 68 leading from one side of the source of supply of current, and the remaining transverse wires 5, 10, etc. connect by wires 69 to 78 with the various positioning solenoids and secondary positioning solenoids in such a manner that when circuit is completed through the line wire 68 and any one of the circuit wires 69 to 78, the delivery mechanism associated with one of the coin holders will operate to deliver a coin or coins from such holder. For example, if the transverse wire marked L is connected with the transverse wire marked 20, two ten cent pieces will be delivered from the ten cent holder, and if the wire L is connected with the transverse wire marked 50, a single fifty cent piece will be delivered from the fifty cent holder.

Each of the contact bars c is connected with one of the transverse wires. One contact bar of each group, the last bar to the right of each group as shown in Fig. 7, is connected with the line wire L, and the remaining contact bars of each group are connected with such transverse wires as will provide for the closing of the circuits necessary for causing delivery of coins to make up the amount represented by the finger keys of the row or bank or keys which coöperates with such group of contact bars. For example, and as will be seen by reference to Fig. 7, the first group of contact bars at the left in said figure, with which the finger keys marked 1, 11, 21, etc., coöperate, are connected respectively with the cross wires marked 1¢, 5, 10, 20, 25, 50, L. The connections of the second group of contact bars with which the row or bank of finger keys marked 2, 12, 22, etc., coöperate are the same except that the first bar is connected with the cross wire 2.

To provide for engagement of the contact device of each finger key with only such contact bars of the group with which the key coöperates as should be connected with the line wire bar of the group in order to cause the delivery of the amount which the particular finger key represents, the upper edges of the contact bars, excepting such bars as are to be engaged by all the finger keys of a row of keys, are formed to provide upstanding engaging portions and cut-away or non-engaging portions, as represented by heavy and light lines respectively in Fig. 7. This arrangement avoids the necessity of specially forming the contact devices of different finger keys to engage only the particular contact bars with which they are respectively required to make contact, and permits of the use of identical contact devices on all the finger keys, each contact device being of a size to extend over the whole group of contact-bars and being capable of making contact with whichever contact bars of the group have upstanding portions beneath such contact device. The last contact bar of each group, which is connected through the transverse wire L directly with the source of supply of current, has its upstanding engaging edge extending continuously beneath the key contact devices so as to be engaged by the contact devices of all the finger keys of the row; and similarly, the first contact bar of each group, with exception of the fifth and tenth groups, is formed without any cut away portion and will therefore be engaged by the contact device of each of the keys of the coöperating row of keys. To insure good contact with the bars, the key contact devices are formed with a plurality of separately yieldable contact members, of which there is at least one for each contact bar of the group with which it is to coöperate. As shown in Fig. 15, the device is best made with two oppositely extending series of downwardly inclined spring fingers. The position of the contact device of one of the finger keys with relation to the group of contact bars with which it coöperates is indicated by the rectangular figure in dotted lines on the third group of contact bars in Fig. 7. This broken line figure represents the position of the contact device carried by the finger key marked 23. Such contact device, as indicated by this broken line figure, extends over all seven of the contact bars of the group but will make contact when depressed with only the first, fourth and last bar as these bars are the only ones which have upstanding contact edges beneath this contact device. The first contact bar of this group is connected through the transverse wire 3 and thereby circuit wire 77 through which circuit is completed for causing the delivery of three cents, and the fourth contact bar of this group is connected through the transverse wire 10 with the circuit wire 70 through which circuit is completed for causing the delivery of two ten cent pieces. The depression of the finger key marked 23 will, therefore, by connecting the first and fourth contact bars of this group with the last contact bar, or line contact bar complete circuits for causing the delivery of 23 cents. The position of another contact device is also indicated by a dotted rectangular figure in Fig. 7, this contact device being the one carried by the finger key marked 75, which is one of the row of keys coöperating with the fifth group of contact bars; and as will be seen from Fig. 7, only the fourth, fifth and sixth contact bars of this group have raised portions beneath this contact device, and as the fourth contact bar of this group is connected with the circuit for causing the delivery of a twenty-five cent piece and the fifth bar is connected with the circuit for causing the delivery of a fifty cent piece, the depression of the finger key marked 75 by connecting these two contact bars with the last or line contact bar will cause operation of the machine for the delivery of seventy-five cents.

The operating circuits and circuit controlling devices are shown diagrammatically in Fig. 16, in which the wires 85 and 86 are the wires connecting from the source of current supply, connection with these wires being made through fuses 87, and a main line switch 88 being provided in the line 68 connected with the supply wire 86. The circuit for the alarm buzzer 16 is connected across the supply and is shown as including a normally open switch or circuit closing device A which represents the circuit closing device formed by the contact pieces 14 and 15 shown in Fig. 3. The line wire 68 is shown as connected to one side of each of a number of normally open circuit closing devices B, C, D, E, F, G, H, I, J, K. The other side of the circuit closing device B is connected by wire 71 with the positioning solenoid 28 for the $1 coin holder and represents the finger key circuit closer 19 which is marked 100 and by the operation of which circuit is completed for causing the delivery of a $1 coin. The other side of the circuit closing device C is connected by wire 74 with the positioning solenoid 28 for the fifty-cent coin holder, and this circuit closing device represents any one of the finger key circuit closers by operation of which circuit is completed for delivering a coin from the fifty cent holder, or more exactly, this circuit closing device C represents such part of any such finger key circuit closer as serves to close the fifty cent delivery circuit. The circuit closing devices D and E are connected respectively with the positioning solenoids 28 of the twenty-five cent and five cent coin holders, and represent the finger key circuit closers which cause delivery of coins from such holders. The circuit closing device F is connected by wire 75 to the secondary positioning, or position determining solenoid 55 and thence to the solenoid 28 associated with the one cent coin holder, and represents the finger key circuit closers the operation of which causes delivery of a single one-cent piece. The circuit closing devices G and H are connected by wires 76 and 77 respectively with the position determining solenoids 56 and 57 and thence to the solenoid 28 of the one cent holder, and represent, respectively, the finger key circuit closers for causing the delivery of two one cent pieces and those causing delivery of three one cent pieces. The circuit closing device I is connected through wire 78 directly with the positioning solenoid 28 for the one cent holder, and represents the finger key circuit closers by operation of which the delivery of four one cent pieces is effected. The circuit closing device J is connected by wire 70 to the positioning solenoid 28 associated with the ten cent holder through the coil W of the solenoid of the secondary positioning means for the ten cent holder, and the circuit closing device K is connected through wire 72 directly with the positioning solenoid 28 of the ten cent holder, these last two circuit closing devices representing, respectively, the finger key circuit closers the operation of which causes the delivery of two ten cent pieces and one one cent piece.

The other side of the $1, fifty-cent, twenty-five cent, five-cent and one-cent positioning solenoids are connected through wire 89, resistance 90 and wire 92 to one side of a normally closed switch M, and the ten cent positioning solenoid is similarly connected through resistance 91 and the wire 92 to the switch M. From the other side of the switch M connection is made by wire $x$ through a normally closed electrically operated switch 93 to the service or supply wire 85, thereby completing the circuit. The normally closed switch M is opened at the end of the expelling movement of the expelling members, and in the construction shown (see Figs. 2, 8, 9 and 10), comprises a contact terminal 103 carried by a member 102 and a spring contact member 104 normally in engagement with the contact terminal 103 and extending in position to be engaged by a pin 105 carried by one of the expelling members and to be moved thereby out of contact with the terminal 103 just before the expelling member reaches the end of its expelling movement. On the return movement of the expelling members the spring contact member 104 moves back into engagement with the terminal 103 thereby again closing the circuit through this circuit closing device, or switch M of the diagram Fig. 16. As shown in Figs. 2, 8, 9 and 10 this circuit closing device or switch is associated with the expelling member 33 for the $1 coin holder, but as all the coin-expelling members are operated whenever a coin is to be delivered from any one or more of the holders this switch will be opened at every delivery operation or at the end of each inward movement of the core of the solenoid 40 and resulting rocking of the shaft 36.

The coil of the electrically operated switch 93, said coil being marked N in the diagram Fig. 16, is connected on one side with the wire 92 and on the other side with the wire $x$ at a point between the switch 93 and the supply wire 85. In other words, the switch coil N is connected in multiple with the switch 93 and the switch M, the switch M being in series with the switch 93. The operating solenoid 40 is connected in series with a normally open switch O in a line leading from the supply line 86 by wire 68 and wires 107 and 106 to the switch M, from which circuit is completed through the wire *x* and electrically operated switch 93 to the supply wire 85. The switch O is closed by movement of any of the positioning levers 25 or 25′, and in the machine shown (see Figs. 2, 4, 8, 9, and 10), is formed by a spring contact member 95 supported by a block 94 and tending to make contact with a contact member 96. A pin 99 at the end of a lever 98 engages the spring contact member 95 and holds it normally out of engagement with the contact member 96 to open the circuit to the solenoid 40 at this point, as shown in Fig. 8. The lever 98 is carried by a shaft 97 and is normally held in the position shown in Fig. 8 by a spring 100. The shaft 97 extends across the machine at the rear thereof and carries a yoke 97′ (see Fig. 4), the upper bar of which extends in position to be engaged by any one of a number of rods 101 which extend downward one from the rear end of each of the positioning levers 25 and 25′. Whenever any one of the positioning solenoids 28 is operated and the corresponding positioning lever raised, the lower end of one of the downwardly extending bars 101 moves forward and by engagement with the yoke 97′ rocks the shaft 97, thereby swinging the arm 99 downwardly and permitting the contact spring 95 to move down into engagement with the terminal 96 to close the circuit of the operating solenoid 40 at this point. The contact terminals then remain in contact so long as any positioning solenoid 28 remains energized and holds up its cores and corresponding positioning lever, but when the shaft 97 is allowed to rock back to normal position under influence of the spring 100 and the arm 98 is again lifted to its normal position as shown in Fig. 8, the contact members are again separated and the circuit to the operating solenoid is again opened at this point, that is, at the switch O as shown in diagram Fig. 16.

In order to prevent undue sparking when any of the above switches are opened, condensers are provided as follows:—A condenser 108 is connected across the normally closed switch M, a condenser 109 is connected across the switch O, and a condenser 110 is connected across the switch 93. The electrically operated switch 93 may be of any suitable form, the switch being normally closed and being opened only when sufficient current flows through the coil. A suitable form of switch, shown in Fig. 13, comprises an electromagnet 111, the armature 114 of which, supported at one end, normally stands in the position shown in this figure and is in electrical connection with the frame 113 and carries a spring contact member 112 which is insulated from the armature but is normally in electrical connection therewith through a contact point adjacent the end of the armature. The magnet frame 113 and the spring contact member are connected to parts of the circuit wire *x* as shown so that in the normal position of the switch the circuit is unbroken at this point. When the magnet is energized and its armature lifted, the spring contact member 112 comes into engagement with a stop 115 by which it is held from following the free end of the armature, and the electrical connection between the armature and the spring member is thereby broken, thus causing the circuit to be opened at this point. The stop 115 as shown is an adjustable stop formed by a screw carried by a support 116 mounted on but insulated from the magnet frame. The magnet coil should be of relatively high resistance such that when circuit is closed through any one or more of the positioning solenoids the switch magnet will not be energized sufficiently to raise its armature and open the switch so long as the switch M remains closed and will only become energized when the switch M is opened and the current finds its only path through the magnet coil. The resistance of the magnet coil should also be such that when the operating circuit is completed only through the magnet coil the current flowing through it will not energize the operating solenoid 40 sufficiently to hold its core against the pull of the springs 42, and most desirably, also, will not energize the positioning solenoids sufficiently to raise the positioning levers or to maintain them in raised position.

The lower part of the machine frame or casing may be formed with spaced plates 117 and 118 adapted to receive a drawer or drawers between them, and the whole machine may be secured in position on any desired support or may be portable and provided with legs 119.

The machine may be provided with coin receiving or delivery devices of various forms. Fig. 17 shows one form of coin cup 10 which is illustrated in the other figures. Fig. 17ᵃ shows a delivery device 10′ adapted to discharge into the open end of an envelop, and Fig. 17ᵇ shows a cup 10ᵃ at the end of a curved chute 10ᵇ which when in position will extend toward the front of the machine so that the cup will be in convenient position close to the operator.

*Operation of the machine.*—Suppose the finger key 19 bearing the mark 75 to be depressed to cause the machine to deliver seventy-five cents. The main switch 88 being closed, the depression of this finger key will close circuit through the positioning solenoids 28 associated with the fifty-cent and twenty-five cent coin holders, that is, the result of depressing this finger key would be represented by the closing of the circuit closing devices C and D of the diagram Fig. 16, whereby circuit will be closed from the supply wire 86 through wire 68 and through branch wires 74 and 73 to the positioning solenoids of the fifty-cent and twenty-five cent holders and thence through wire 89, resistance 90, wire 92, switch M, wire $x$ and switch 93 to the supply wire 85. By the closing of this circuit the positioning solenoids for the fifty-cent and twenty-five cent holders will be energized and their cores 27 will be raised to lift the corresponding positioning levers by which the coin-expelling members of these two coin holders will be raised into operative position. As the positioning levers are lifted, the shaft 97 is rocked and its lever 98 is moved downwardly to permit the contact member 95 to move into engagement with the contact member 96 (these two contact members forming the normally open switch O of the diagram Fig. 16), thereby closing the circuit through the operating solenoid 40 as follows:—From the supply wire 86 through wire 107 to the solenoid 40 and thence through switch O, wire 106, switch M, wire $x$ and switch 93 to the supply wire 85. The operating solenoid being thus energized, its core is drawn inward and the shaft 36 is rocked to operate all the coin-expelling members 33 and 33′, and the expelling members associated with the fifty cent and twenty-five cent coin holders being then in operative position, one coin will be discharged from each of these holders into the trough 9 and thence to the cup 10. Just before the coin-expelling members reach the end of their rearward or operative movement, the switch M will be opened by the pin 105 on the expelling member associated with the $1 coin holder coming into engagement with the spring contact member 104 and moving it away from the contact terminal 103.

By the opening of the switch M the circuits through the operating solenoid 40 and through the positioning solenoids are broken and the solenoids being thus deenergized the core of the operating solenoid moves back to normal position under the influence of the springs 42, thereby retracting the coin-expelling members, and the positioning levers fall back to normal position thereby opening the switch O. With the retraction of the coin-expelling members, the switch M is again closed, but the momentary opening of the switch M has resulted in causing the current from the wire 92 to flow through the switch magnet coil N thereby energizing the switch magnet and opening the switch 93. This switch in the return line $x$ then remains open after the closing of the switch M and prevents further operation of the positioning and expelling devices until the circuit through the positioning solenoid or solenoids, which circuit is now completed only through the switch magnet, is broken by the return to normal position of the key by depression of which the machine was caused to operate. When the circuit through the positioning solenoid or solenoids is opened at the switch M or the switch 93 and remains closed only through the coil N of the switch magnet, the resistance of the magnet coil N reduces the intensity of the current flowing through the circuit to such extent that it cannot energize the positioning solenoids sufficiently to raise the cores thereof or to maintain them raised. The positioning levers 25 which have been lifted drop back, therefore, to normal position, thereby opening the switch O in the circuit of the operating solenoid 40 as before stated and also dropping the expelling members which had been raised to operative position so that in their return movement they will move clear of the bottom coins in their holders. When the finger key which has been depressed is released and returns to its normal position, thereby opening the circuit through the switch magnet, the switch 93 closes and the machine is again in condition to be set in operation by the depression of any desired finger key.

It will be noted that the arrangement of the circuits with the electrically operated switch 93 prevents more than a single operation of the coin-expelling members from the time any finger key is depressed until such key has been released and has returned to its inoperative position. The depressing of a second key before the previously depressed key has been released will, therefore, not cause the expelling members to be operated, and all chance of confusion in the delivery of coins from holders which might result from failure to release a finger key before pressing the next key is thus avoided.

From the operation above described, together with the preceding description of the machine and of the operation of parts thereof, the operation of the machine when any one of the finger keys is depressed will be understood. It will be understood that when a key is depressed to cause the delivery of an amount which calls for the discharge of a single coin from the ten cent holder or of three or less coins from the one cent holder the only difference in operation will be that by the operation of the proper secondary positioning solenoid one of the stop rods will be projected to limit the upward movement of the positioning lever so as to cause the expelling member to be positioned for delivering the desired number of coins. It will be noted that in the arrangement shown the secondary positioning solenoids 55, 56 and 57 of the delivery mechanism for the one cent holder are each connected in series with the positioning solenoid 28 for this holder, and that the secondary positioning solenoid for the ten cent holder, marked W in the diagram Fig. 16, is connected in series with the positioning solenoid 28 for this holder. This arrangement avoids multiplicity of contacts in the finger key selective members and tends to prevent mistakes in the operation of the machine.

The particular arrangement of elements which forms the machine described is well adapted to the rapid dispensing of coins in making change. While the machine described comprises one hundred keys whereby sums from one cent to one dollar may be quickly dispensed, it is obvious that a machine with considerably less keys may be employed without departing from the inventive idea disclosed. In many places change is made which does not require the use of cent pieces, and in such case the one cent holder and associated parts may be omitted. The omission of the one cent holder and keys and mechanism associated therewith will materially reduce the size of the machine, the range of value being then from five cents to one dollar. The size and shape of the several parts as well as the material of which they are made and the finish imparted to them is of course immaterial in the practice of the inventive idea.

What I claim as my invention is—

1. In a coin delivery machine, the combination with a coin holder, of an expelling member for delivering coins from the holder, operating means for operating said expelling member, controlling means for controlling said expelling member to determine whether it shall or shall not deliver a coin when operated by said operating means, and means controlled by said controlling means to cause said operating means to operate the expelling member.

2. In a coin delivery machine, the combination with a plurality of coin holders, of an expelling member for each holder for delivering coins therefrom, operating means for smiultaneously operating all said expelling members, selectively operated positioning means for moving the expelling members into operative position, and means controlled by the positioning means for causing operation of the operating means.

3. In a coin delivery machine, the combination with a plurality of coin holders, of a delivery device associated with each holder for delivering coins therefrom, operating means for simultaneously operating all said delivery devices, selecting mechanism for selectively determining which of said delivery devices shall deliver coins from the respective holders when operated by the operating means, said selecting mechanism including variable position determining means for determining the number of coins to be delivered from one or more of the holders, and means controlled by said selecting mechanism for causing operation of the operating means.

4. In a coin delivery machine, the combination with a plurality of coin holders, of a delivery device associated with each holder for delivering coins therefrom, operating means for simultaneously operating all of said delivery devices, a plurality of keys, means controlled by said keys for selectively determining which of said delivery devices shall deliver coins from the respective holders when operated by the operating means, and means for preventing repeated operation of the operating means while a key remains out of normal position.

5. In a coin delivery machine, the combination with a plurality of coin holders, of delivery devices for delivering coins from the holders, operating means for operating said delivery devices, a plurality of keys, means controlled by said keys for selectively rendering the delivery devices operative, means controlled by said key controlled means for causing operation of the operating means, and means controlled by the operating means for preventing repeated operation thereof while any finger key remains out of operative position.

6. In a coin delivery machine, the combination with a plurality of coin holders, of an expelling member for each holder for delivering coins therefrom, said expelling members being inoperative when in normal position, positioning members, means for selectively operating said positioning members to move selected expelling members into operative position, and selectively operated variable position-determining means associated with one of said positioning members for limiting its positioning movement according to the number of coins to be delivered by the expelling member which is positioned thereby.

7. In a coin delivery machine, the combination with a coin holder, of an expelling member for delivering coins from the holder, electro-magnetically operated means for rendering the expelling member operative, and electro-magnetically operated means controlled by the first said electro-magnetically operated means for operating the expelling member.

8. In a coin delivery machine, the combination with a coin holder, of an expelling member for delivering coins from the holder, a positioning member for moving the expelling member into operative position, an electro-magnet for operating said positioning member, an electro-magnet for operating the expelling member, a key for controlling the circuit to the positioning electro-magnet, and a circuit closing device controlled by movement of the positioning member for controlling the circuit to the operating magnet.

9. In a coin delivery machine, the combination with a coin holder, of an expelling member for delivering coins from the holder, a positioning member for moving the expelling member into operative position, an electro-magnet for operating the expelling member, key controlled means for operating the positioning member, and a circuit closing device controlled according to movement of the positioning member for closing the circuit to the operating magnet.

10. In a coin delivery machine, the combination with a coin holder, of an expelling member for delivering coins from the holder, electrically controlled means for operating said expelling member, electrically controlled means for positioning the expelling member, a circuit controlling key for controlling a circuit to cause the positioning means to position the expelling member, and a circuit closing device automatically operated to cause the expelling member to make its delivery movement when it has been positioned.

11. In a coin handling machine, the combination with a coin holder, an expelling member for delivering coins from the holder, an electro-magnet for operating the expelling member, electrically controlled variable position determining means for positioning the expelling member for the delivery of one or a plurality of coins from the holder, a plurality of circuit closing keys for selectively controlling circuits to cause operation of the variable position determining means, each key corresponding to a particular number of coins to be delivered from the holder, and means for automatically closing a circuit to said operating magnet simultaneously with the positioning of the expelling member.

12. In a coin delivery machine, the combination with a plurality of coin holders, of an expelling member associated with each holder for delivering coins therefrom, electrically controlled means for operating the expelling members, means including electro-magnets for controlling the position of the expelling members, a plurality of circuit controlling keys whereby a circuit may be closed to said magnets to selectively position the expelling members, and means controlled by a part arranged to be operated by any one of said magnets for closing a circuit to cause said operating means to impart delivery movement to the selected delivery devices.

13. In a coin delivery machine, the combination with a plurality of coin holders, of an expelling member associated with each holder for delivering coins therefrom, electrically operated means for simultaneously operating all said expelling members, key operated mechanism for selectively determining which of said expelling members shall deliver coins from the respective holders when operated by the operating means, means controlled by operation of said key operated mechanism for closing a circuit to said operating means.

14. In a coin delivery machine, the combination with a plurality of coin holders, of an expelling member associated with each holder for delivering coins therefrom, electrically operated means for simultaneously operating all said expelling members, key operated mechanism for selectively determining which of said expelling members shall deliver coins from the respective holders when operated by the operating means, means controlled by operation of said key operated mechanism for closing circuit to said operating means, means for automatically opening the operating circuit, and an electrically operated switch for preventing repeated operation of the operating means while a key is out of normal position.

15. In a coin delivery machine, the combination with a plurality of coin holders, of an expelling member associated with each holder for delivering coins therefrom, an electro-magnet for operating said expelling members, a series of electro-magnets for controlling the expelling members, means for selectively controlling circuits to said controlling magnets to determine the coins to be delivered, means for closing a circuit to the operating magnet, and a normally closed electrically operated switch controlling the circuit to the operating magnet to prevent repeated energization thereof.

16. In a coin delivery machine, the combination with a plurality of coin holders, of an expelling member associated with each holder for delivering coins therefrom, an electro-magnet for operating the expelling members, a plurality of electro-magnets for positioning the expelling members, a plurality of circuit closing keys whereby a circuit may be closed to said positioning magnets to selectively position the expelling members, means operated by the positioning magnets for closing circuit to the operating magnet, a normally closed circuit breaking device controlling the circuits to the positioning magnets and operated to open the circuits by operation of the operating magnet, and a second normally closed circuit breaking device controlling the operating magnet circuit and operated to break said circuit by a magnet connected in the positioning magnets' circuit across said first mentioned circuit breaking device and having a coil of relatively high resistance for the purpose set forth.

17. In a coin delivery mechanism, the combination with a plurality of coin holders, of an expelling member associated with each holder for delivering coins therefrom and normally out of operative position, means for operating the expelling members, positioning mechanisms for moving the coin-expelling members into operative position, one such mechanism being associated with each of the coin holders and the expelling member associated therewith, a plurality of electric circuits each including one positioning mechanism, a circuit including the means for operating the expelling members, and a plurality of circuit closing devices, the number of such circuit closing devices being substantially greater than the number of positioning mechanism circuits and each such device bearing a mark indicating a certain amount and each bearing a different mark, the operation of any of said circuit closing devices causing the closing of predetermined positioning mechanism circuits and of the coin expelling operating means circuit, whereby coins aggregating the value indicated by the circuit closing device operated will be delivered.

18. In a coin delivery mechanism, the combination with a coin holder having a suppporting shelf, a coin expelling member mounted to move transversely of the holder and normally lying in position to move below the bottom coin in the holder, an electromagnet for operating said member, positioning means for raising said member into operative position, and means controlled by the operation of the positioning means for closing a circuit to said magnet.

19. In a coin delivery mechanism, the combination with a plurality of coin holders, of an expelling member associated with each holder movable transversely of the holder and normally in position to move below the bottom coin in the holder, means for operating the expelling members, lifting means associated with each expelling member for lifting the same into operative position, means for selectively operating said lifting means, and means controlled by the movement of each of said lifting means for causing the operating means to operate.

20. In a coin delivery mechanism, the combination with a coin holder, of an expelling member for delivering the coins from the holder and adjustable for delivering one or a plurality of coins, and means for adjusting the expelling member comprising means for imparting adjusting movement to the member and a plurality of stops for limiting such adjusting movement, said stops being independently operable and standing normally in inoperative position.

21. In a coin delivery mechanism, the combination with a coin holder, of an expelling member for delivering coins from the holder and adjustable into position for delivering one or a plurality of coins, a key, means controlled by the key for imparting adjusting movement to the expelling member, a normally retracted stop for limiting the adjusting movement of the expelling member, and means controlled by said key for moving said stop into operative position.

22. In a coin delivery mechanism, the combination with a coin holder, of an expelling member for delivering coins therefrom and adjustable into position for delivering one or a plurality of coins, means for imparting adjusting movement to the expelling member, a plurality of keys by any one of which said means is caused to impart adjusting movement to the expelling member, a normally inoperative stop for limiting the movement of the expelling member, and means controlled by one of said keys for rendering said stop operative.

23. In a coin delivery mechanism, the combination of a coin holder, of an expelling member for delivering coins from the holder and movable into position for delivery of one or a plurality of coins, a positioning magnet for imparting positioning movement to the expelling member, a normally inoperative stop for limiting the positioning movement of the expelling member, a secondary positioning magnet for rendering said stop operative, and a plurality of keys by which a circuit may be closed to said positioning magnet and the operation of one of which keys also closes circuit to the secondary positioning magnet.

24. In a coin delivery machine, the combination with a coin holder, of an expelling member for delivering coins from the holder which is adjustable for delivering one or a plurality of coins, and adjusting means comprising an electro-magnet for imparting adjusting movement to the expelling member and a plurality of stops for limiting the adjusting movement, each stop limiting the adjusting movement for the delivery of a particular number of coins and all of said stops except one being operated by electro-magnets, each of said stop operating magnets being independently connected in series with the movement imparting magnet.

25. In a coin delivery mechanism, the combination with a coin holder, of an expelling member for delivering coins from the holder and movable into position for delivering one or a plurality of coins, a key, means controlled by said key for imparting positioning movement to the expelling member, and other means controlled by said key for limiting such positioning movement.

26. In a coin delivery mechanism, the combination with a coin holder, of an expelling member for delivering coins from the bottom of the holder and adapted to be lifted to different heights for delivering different numbers of coins, means for lifting said member, a plurality of pins adapted to be moved into the path of said member during upward movement thereof whereby the height of lift is varied, electro-magnets for operating said pins, and means for imparting delivery movement to said member after it has been lifted into position, whereby the number of coins desired may be delivered from the holder.

27. In a coin delivery mechanism, the combination with a coin holder, of a coin expelling member movable transversely of the holder and also movable to different heights relatively thereto according to the number of coins to be expelled from the holder, said member being provided with a portion projecting therefrom the depth of which is at least equal to the thickness of the greatest number of coins to be expelled, a plurality of pins adapted to limit the upward movement of the holder and to determine the number of coins to be expelled, solenoids for operating said pins, and means for subsequently moving said member transversely of the holder to deliver coins therefrom.

28. In a coin delivery mechanism, the combination with a coin holder, of an expelling member for delivering coins from the holder, an electro-magnet for lifting said expelling member into operative position, means for closing a circuit to said magnet, operating means for giving said expelling member its delivery movement, and means for automatically deënergizing said magnet to permit the expelling member to move clear of the bottom coin in the holder in making its return movement.

29. In a coin delivery mechanism, the combination with a coin holder, of an expelling member for delivering coins from the holder, an electro-magnet for lifting said member, electro-magnets for determining the extent to which said member may be lifted, means for selectively energizing said magnets, and electrically operating means for moving the expelling member to deliver coins from the holder.

30. In a coin delivery machine, the combination with a plurality of coin holders and means for delivering coins therefrom, of a follower in each holder to move in engagement with the stack of coins in the holder and having a projection extending through a slot in the holder, a rod extending adjacent the holders and adapted to be moved by the projection of any one of said followers when the follower reaches a certain position, an electrically operated alarm device, and a normally open circuit closing device controlling the alarm device circuit and adapted to be operated to close said circuit by movement of said rod.

31. Circuit selecting means for a coin handling machine, comprising in combination a group of terminal bars, and a series of circuit closing keys for coacting with said terminal bars, some of said bars having inactive or non-contacting portions beneath some of the keys, and each key operating a circuit closing contact device extending over the whole group of terminal bars and comprising a series of separately yielding contact members one of which is in position corresponding to each of said terminal bars.

32. Circuit selecting means for a coin handling machine comprising in combination a group of terminal bars, and a series of circuit closing keys for coacting with said terminal bars, said bars being formed of flat metal strips set flatwise of each other and some of said bars having portions of their contact edges cut away to prevent engagement therewith of the contact devices of the keys which are opposite such cut away portions.

In testimony whereof I sign my name in the presence of two witnesses.

HARRY MENDELSOHN.

Witnesses:
MICHAEL IANNSAE,
LAURENCE J. GALLAGHER.

Copies of this patent may be obtained for five cents each, by addressing the "Commissioner of Patents, Washington, D. C."